US012743435B2

(12) United States Patent
Newman et al.

(10) Patent No.: US 12,743,435 B2
(45) Date of Patent: Sep. 22, 2026

(54) AUTONOMOUS GENERATION OF QUERY RESPONSES

(71) Applicant: Satisfi Labs Inc., Tampa, FL (US)

(72) Inventors: Randy Newman, Tampa, FL (US); Don White, Tampa, FL (US)

(73) Assignee: Satisfi Labs Inc., Tampa, FL (US)

( * ) Notice: Subject to any disclaimer, the term of this patent is extended or adjusted under 35 U.S.C. 154(b) by 0 days.

(21) Appl. No.: 19/191,894

(22) Filed: Apr. 28, 2025

(65) Prior Publication Data

US 2025/0342161 A1 Nov. 6, 2025

Related U.S. Application Data

(60) Provisional application No. 63/641,584, filed on May 2, 2024.

(51) Int. Cl.
*G06F 16/00* (2019.01)
*G06F 16/2458* (2019.01)

(52) U.S. Cl.
CPC ................................ *G06F 16/2458* (2019.01)

(58) Field of Classification Search
CPC .................................................. G06F 16/2458
USPC ......................................................... 707/769
See application file for complete search history.

(56) References Cited

U.S. PATENT DOCUMENTS

2024/0069907 A1* 2/2024 Groenewegen ........... G06F 8/33 707/707
2025/0181835 A1* 6/2025 Jin ......................... G06F 40/30 707/707
2025/0232471 A1* 7/2025 Zhou ........................ G06T 7/75 707/707
2025/0238629 A1* 7/2025 Malkiel ................. G06F 40/194 707/707
2025/0322000 A1* 10/2025 Takamine ........... G06F 16/3344 707/707
2025/0335455 A1* 10/2025 Pineda .................. G06F 16/248 707/707

* cited by examiner

*Primary Examiner* — Alexandria Y Bromell
(74) *Attorney, Agent, or Firm* — Bradley Arant Boult Cummings LLP; Adam J. Thompson

(57) ABSTRACT

The present disclosure relates to systems and methods for generating natural language responses to queries using vector-based matching. A system can include a data store and at least one computing device in communication with the data store. The computing device can receive a query including a set of query text, generate a vector representation of the set of query text, perform a vector-based matching operation on the vector representation of the set of query text against a plurality of response entries stored in the data store, determine a particular response entry to use for the query based on the vector-based matching operation, and generate a response to the query based on the particular response entry. The response may include a natural language expression that incorporates a value of a property associated with a code in the particular response entry.

18 Claims, 6 Drawing Sheets

AUTONOMOUS GENERATION OF QUERY RESPONSES

CROSS-REFERENCE TO RELATED APPLICATIONS

This application claims the benefit of, and priority to, U.S. Provisional Application No. 63/641,584, filed on May 2, 2024, and entitled "GENERATING APPROPRIATE RESPONSES BASED ON RECEIVED QUERIES," the contents of which are hereby incorporated by reference in its entirety as if set forth herein.

TECHNICAL FIELD

This application generally relates to systems and methods for generating responses to input queries and, more specifically, to generating a prewritten response, a generated response, or a combination thereof based on the received query.

BACKGROUND

Large Language models can automate the creation of text-based responses in a conversational manner that closely resembles human communications. However, deploying these models is challenging when accuracy is paramount. Some input queries cover topics that require more control over specific wording of responses to ensure completeness and accuracy. The challenge lies in distinguishing between input queries that can be satisfactorily answered with generative content and those that the company prefers to provide a prewritten response. There are no systems that are capable of differentiating input queries that are intended to provide a prewritten response instead of a generative response, and vice versa. Furthermore, there are no systems that are capable of generating a hybrid response, which can combine a prewritten response with a generative response. Additionally, there's a need to make this selective response routing accessible to clients who may lack extensive expertise in training Artificial Intelligence (AI)-powered systems.

Therefore, there is a long-felt but unresolved need for a system or method that differentiates input queries based on the desired response type (e.g., a generated response versus a prewritten response), generates a response according to the identified input query type, and integrates a prewritten response with a generative response, or vise-versa, to create a hybrid response approach.

BRIEF SUMMARY OF DISCLOSURE

Briefly described, and in various examples, the present disclosure relates to systems and methods for matching queries to desired response entries. The disclosed system can include various components and processes that manage query communication between clients and entities. A query can define a natural language request made by the client for information associated with the particular entity. The entity can define any particular organization, while the client can define any particular patron interacting the particular organization. For example, a particular query created by a client and directed towards an entity can include a request stating, "How can I get tickets to the next Boston Braves baseball game?" where the Boston Braves are the particular entity. In some scenarios, particular queries can be better answered through predefined response entries. The disclosed system can perform various processes for identifying if a novel query requires a predefined response entry and generating the particular response accordingly.

The disclosed system can include a computing environment, one or more entity devices, and one or more client devices, among other components. The computing environment can function as the central computing resource of the disclosed system. The entity devices can include one or more computational devices facilitating interactions between entities and the computing environment. The client devices can include one or more computational devices facilitating interactions between clients and the computing environment.

The entity devices can configure the computing environment to generate particular response entries based on the received query. The response entries can include but are not limited to prewritten responses, hybrid responses, and generated responses. The prewritten response can define responses prewritten and submitted by the entity device to the computing environment. The hybrid response can include a combination of prewritten text and code such that the code can generate some form of data and can populate the remainder of the hybrid response when executed by the computing environment. The generated response can include a response generated by a Large Language Model (LLM) or similar natural language processing algorithm. The entity device can send the computing environment a configuration request. The configuration request can include sample queries, the prewritten response, the hybrid response, any other pertinent information, or a combination thereof. The configuration requests can define the particular response entry and queries that would elicit such a response. The computing environment can vectorize the contents of the configuration request and store the vector embeddings in a vectorized data store.

The client device can send one or more queries to the computing environment. The computing environment can vectorize the queries and compare the queries to the vectorized data stored in the vectorized data store. The computing environment can calculate the distance between vector embeddings to identify similarities between the queries received by the client device and the responses received by the entity device. The computing environment can assess threshold parameters to identify the response that most closely relates to the query. As an example, the computing environment can determine a response meeting one or more threshold parameters as the most related to the query. As another example, the computing environment can determine a vector-based distance from each response to the query and return the shortest calculated distance response as the most related to the query. For example, the computing environment can identify a prewritten response as the closest related response to the particular query and can send the response to the client device. In another example, the computing environment can fail to identify any related responses to the query and can process the query through the LLM to produce a generated response for the client device.

These and other aspects, features, and benefits of the claimed innovation(s) will become apparent from the following detailed written description of the preferred examples and aspects taken in conjunction with the following drawings, although variations and modifications thereto may be affected without departing from the spirit and scope of the novel concepts of the disclosure.

BRIEF DESCRIPTION OF THE FIGURES

The accompanying drawings illustrate one or more examples and/or aspects of the disclosure and, together with the written description, serve to explain the principles of the disclosure. Wherever possible, the same reference numbers are used throughout the drawings to refer to the same or like elements of the present concept, and wherein.

DETAILED DESCRIPTION

Figure 1:
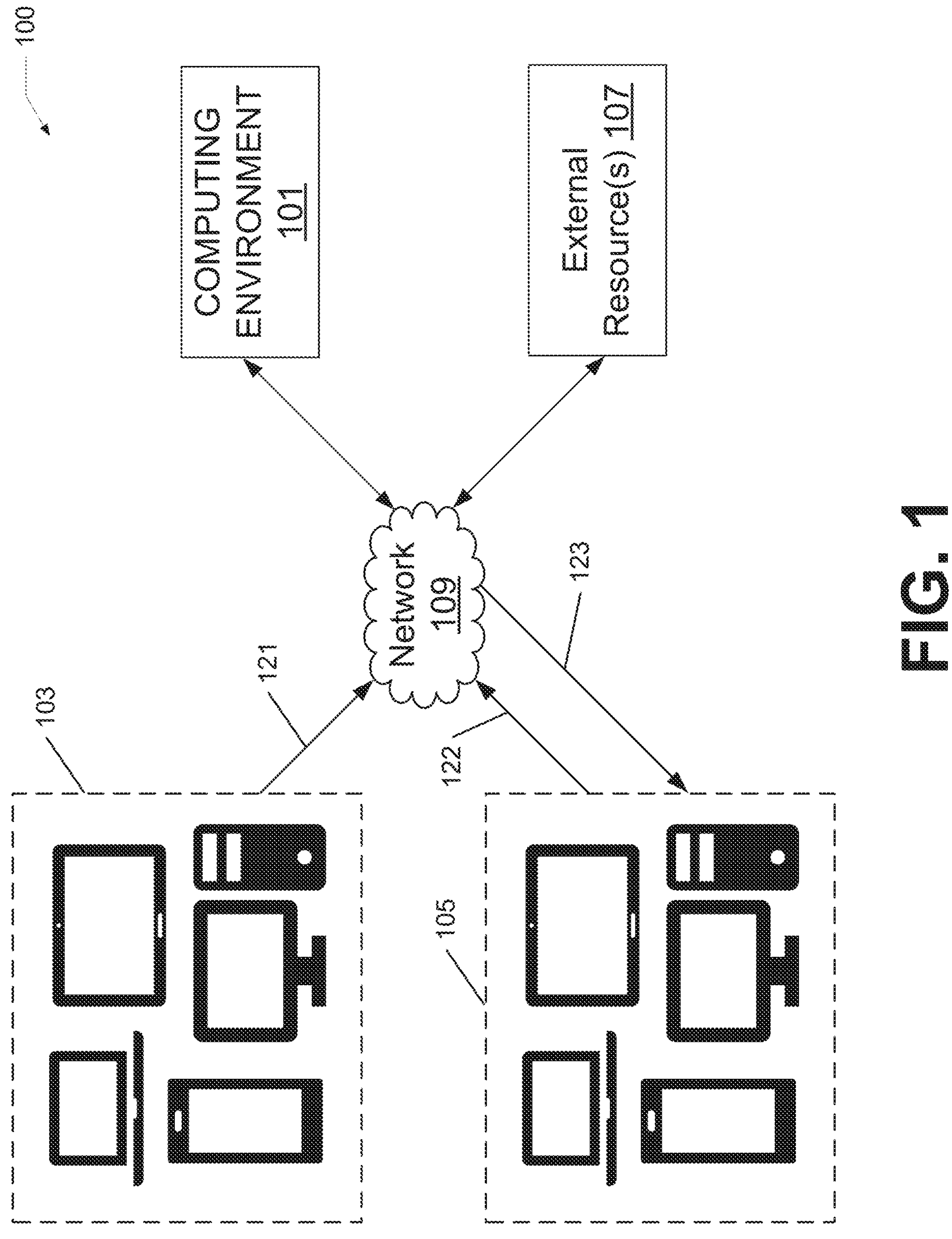
FIG. 1 illustrates an example workflow diagram of a networked environment, according to one example of the disclosed technology.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

OVERVIEW

For the purpose of promoting an understanding of the principles of the present disclosure, reference will now be made to the examples illustrated in the drawings and specific language will be used to describe the same. It will, nevertheless, be understood that no limitation of the scope of the disclosure is thereby intended; any alterations and further modifications of the described or illustrated examples and any further applications of the principles of the disclosure as illustrated therein are contemplated as would normally occur to one skilled in the art to which the disclosure relates. All limitations of scope should be determined in accordance with and as expressed in the claims.

Aspects of the present disclosure generally relate to systems and methods for matching queries to desired response entries. The disclosed system can include various components and processes that manage query communication between clients and entities. A query can define a natural language request made by the client for information associated with the particular entity. The entity can define any particular organization, while the client can define any particular patron interacting the particular organization. For example, a particular query created by a client and directed towards an entity can include a request stating, "How can I get tickets to the next Boston Braves baseball game?" where the Boston Braves are the particular entity. In some scenarios, particular queries can be better answered through predefined response entries. The disclosed system can perform various processes for identifying if a company would prefer to provide a predefined response entry or a generated response to a novel query.

The disclosed system can include a computing environment, one or more entity devices, and one or more client devices, among other components. The computing environment can function as the central computing resource of the disclosed system. The entity devices can include one or more computational devices facilitating interactions between entities and the computing environment. The client devices can include one or more computational devices facilitating interactions between clients and the computing environment.

The entity devices can configure the computing environment to generate particular response entries based on the received query. The response entries can include but are not limited to prewritten responses, hybrid responses, and generated responses. The prewritten response can define responses prewritten and submitted by the entity device to the computing environment. The hybrid response can include a combination of prewritten text and code such that the code can generate some form of data and can populate the remainder of the hybrid response when executed by the computing environment. The generated response can include a response generated by a Large Language Model (LLM) or similar natural language processing algorithm. The entity device can send the computing environment a configuration request. The configuration request can include sample queries, the prewritten response, the hybrid response, any other pertinent information, or a combination thereof. The configuration requests can define the particular response entry and queries that would elicit such a response. The computing environment can vectorize the contents of the configuration request and store the vector embeddings in a vectorized data store.

The client device can send one or more queries to the computing environment. The computing environment can vectorize the queries and compare the queries to the vectorized data stored in the vectorized data store. The computing environment can calculate the distance between vector embeddings to identify similarities between the queries received by the client device and the responses received by the entity device. The computing environment can assess threshold parameters to identify the response that most closely relates to the query. For example, the computing environment can identify a prewritten response as the closest related response to the particular query and can send the response to the client device. In another example, the computing environment can fail to identify any related responses to the query and can process the query through the LLM to produce a generated response for the client device.

EXAMPLE EMBODIMENTS

Referring now to the figures, for the purposes of example and explanation of the fundamental processes and components of the disclosure, reference is made to FIG. 1, which illustrates an example workflow diagram 100. As will be understood and appreciated, the workflow diagram 100 shown in FIG. 1 represents merely one approach or example of the present concept, and other aspects can be used according to various examples of the present concept.

Figure 2:
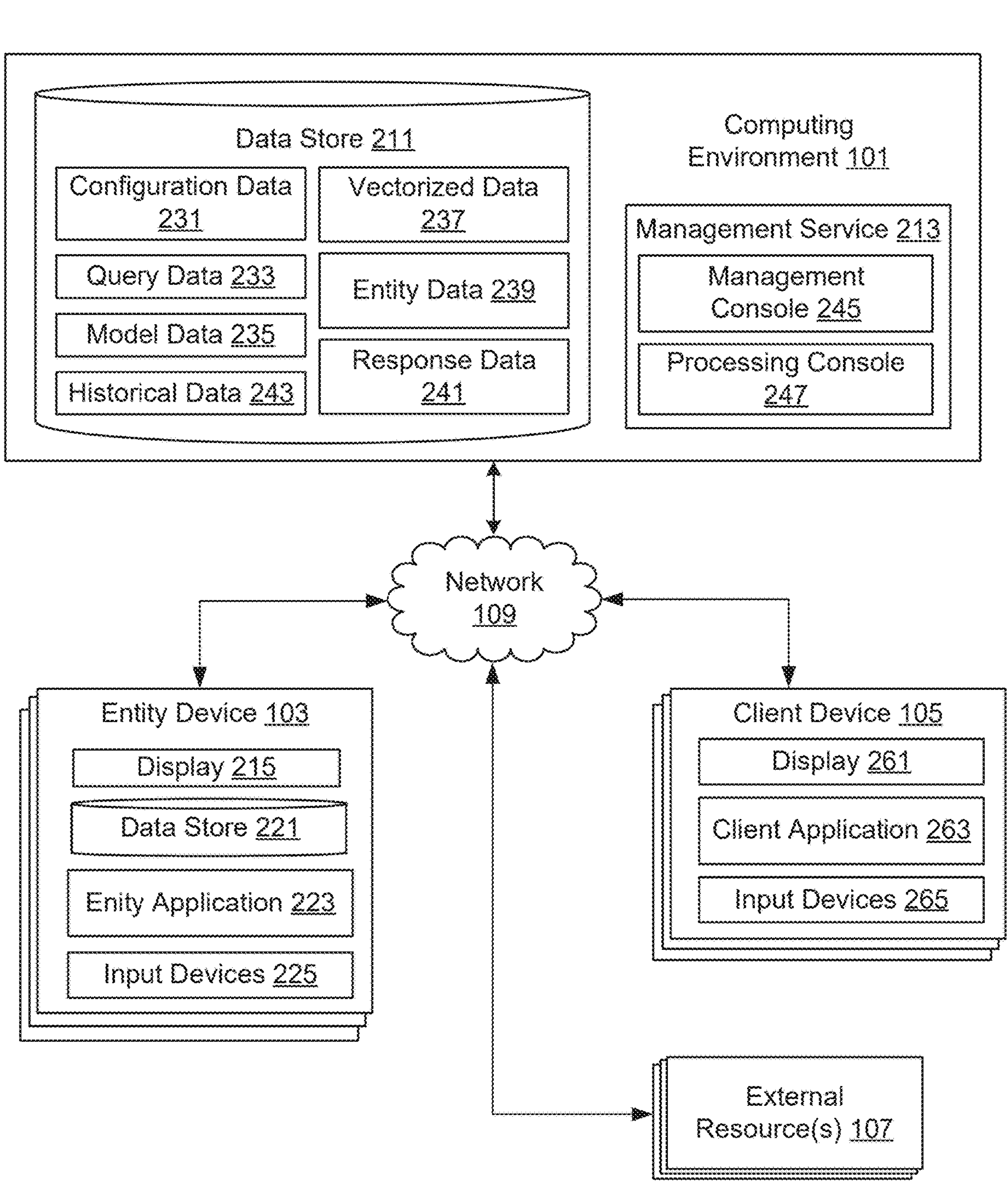
FIG. 2 illustrates the networked environment, according to one example of the disclosed technology.

The workflow diagram 100 can illustrate a series of example data communications sent across a networked environment 200 (see FIG. 2). The networked environment 200 can include various components that can dynamically determine the most appropriate response to a query. A query can be defined as an input that includes natural language (referred to herein as a set of query text) and specifies a request for information. For example, the query can include a written request asking where to purchase official tickets for a sporting event. Based on the received query, one or more components of the networked environment 200 can respond to the query with a prewritten response, a generated response, and/or a hybrid response (the collective of which can also be referred to herein as response entries). A prewritten response can define a response type that includes information that was prewritten and provided to the networked environment 200. The generated response can include any particular response generated by a Large Language Model (LLM) and/or a similar algorithm. In some embodiments, the computing environment 101 can generate a response from different LLMs, score the responses from the LLMs, and determine a highest scored response as the generated response. The hybrid response can be a combination of the prewritten response and the generated response. For example, the networked environment 200 can receive a prewritten response with embedded code. Continuing this example, a component of the networked environment 200 can execute the embedded code and call the LLM and/or the similar algorithm to generate a specific portion of the hybrid response. The prewritten portion of the hybrid response can be combined with the generated portion of the hybrid response to form the hybrid response. In some embodiments, the embedded code can include a query for processing by the LLM.

The networked environment 200 can include a computing environment 101, one or more entity devices 103, one or more client devices 105, and one or more external resources 107, which can be in data communication with each other via a network 109. The network 109 can include, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, Bluetooth networks, Wi-Fi networks, near field communication (NFC) networks, and other types of networks.

The computing environment 101 can function as the central computing infrastructure of the networked environment 200. The computing environment 101 can process data received from the entity devices 103, generate responses to one or more queries received from the client devices 105, store data, and/or distribute data across the network 109. Other functionalities can be performed by the computing environment 101 as will be discussed in further detail herein.

The entity device 103 can include any particular computing system belonging to an entity. The entity can be defined as any particular organization that employs the computing environment 101 to generate specific responses to queries associated with the particular organization. For example, the entity can include a professional baseball team. In another example, the entity can include a non-profit organization that promotes travel to a specific region.

The client device 105 can include any particular computing system belonging to a client. The client can be defined as any particular individual requesting information associated with a particular entity. The client can employ the client device 105 to generate requests for information from the computing environment 101. For example, the client can include a patron attending a baseball game of the professional baseball team. In another example, the client can include an individual planning a vacation to the specific region promoted by the non-profit organization.

The external resources 107 can include any external computing system that can store and distribute pertinent data. External resources 107 can include but are not limited to entity servers, third-party servers, private servers, public servers, government servers, and/or search engine servers. The external resources 107 can be components of the entity device 103. For example, the entity device 103 can include the entity servers of the external resource 107. The external resources 107 can include data used by the computing environment 101 to perform particular actions. For example, the computing environment 101 can extract and process policy documents associated with a particular entity and stored in the external resources 107.

The entity device 103 can configure the computing environment 101 to produce a specific response type when answering the particular query received from the client device 105. To initiate the configuration, the entity device 103 can send a configuration request 121 across the network 109 to the computing environment 101. The configuration requests 121 can define various parameters that inform the computing environment 101 how to respond to specific queries received from the client device 105. The configuration request 121 can include but is not limited to the prewritten response, one or more sample queries, training data, entity-specific documents, a language type, content group information, content type information, a response name, a channel name, a volume name, the hybrid response, and/or a request to generate the entire response. For example, in a case where the entity would like a specific prewritten response to a particular query without any deviations, the entity device 103 can generate and send the configuration request 121 with a particular prewritten response. In another example, when the entity would like less oversight over the response, the entity device 103 can generate and send the configuration request 121 with a particular hybrid response. Continuing this example, the particular hybrid response can include various portions of prewritten text and various portions of embedded code used to call the LLM to generate the remaining portions of the particular hybrid response. In yet another example, when the entity does not have any preference over the content of the response, the entity device 103 can generate and send the configuration request 121 with a request to generate the particular response using the LLM and/or a similar algorithm.

The configuration request 121 can include the training data. The training data can include sample queries that are associated with a particular response. The sample queries can include prewritten sample queries submitted through one or more configuration request 121 and/or generated sample queries produced by the computing environment through the LLM. The sample queries can define particular questions and/or requests for information that would elicit the computing environment 101 to generate a stored response. For example, when an entity would like the computing environment 101 to generate a particular prewritten response, the entity device 103 can provide the computing environment 101 with various prewritten sample queries that would elicit the particular prewritten response. If the entity device 103 does not provide prewritten sample queries or determines to increase the number of prewritten sample queries, the computing environment 101 can employ the LLM to generate generated sample queries that would elicit the particular response. For example, the computing environment 101 can process a particular prewritten response, hybrid response, one or more prewritten sample queries, or a combination thereof. The computing environment 101 can generate, based on the processed information, various generated sample queries that can elicit the particular response. For example, the computing environment 101 can employ the LLM and/or the similar algorithm to generate one or more generated sample queries that would elicit the particular response.

The computing environment 101 can process the one or more configuration requests 121. The computing environment 101 can process the configuration request 121 by extracting the data from the configuration request 121. For example, the computing environment 101 can store in a data store 211 (see FIG. 2) the sample queries, the particular response, and/or any other information included in the configuration request 121. The computing environment 101 can process the sample queries and the particular response by tokenizing the sample queries and the particular response. The computing environment 101 can generating vector embeddings for each particular token. The token can be defined as a series of characters that define a portion of written text extracted from a textual input (e.g., the sample queries, the particular response). For example, the computing environment 101 can parse through the sample queries and tokenize each word of each sample query. In another example, the computing environment 101 can parse through the particular response and tokenize each word of the particular response. The tokens can be any particular length of character. For example, the tokens can include words, phrases, sentences, paragraphs, or any combination of characters. On tokenizing each word of the sample queries and the particular response, the computing environment 101 can generate vector embeddings for each token. The vector embeddings for each token can define numerical equivalents for each word. The computing environment 101 can map the vector embeddings within a multi-dimensional space. The computing environment 101 can calculate a multi-dimensional distance between each vector embedding to quantify the differences between each particular word. For example, a relatively small multi-dimensional distance between two particular tokens can indicate that the words are substantially similar. If the multi-dimensional distance between two particular tokens are within a predefined threshold distance from each other, than the words can be categorized or labeled as substantially similar. In some embodiments, the computing environment 101 can generate a similarity score based on the multi-dimensional distance. The computing environment 101 can store the vector embeddings in a vectorized database for further processing.

Once the computing environment 101 is configured, the computing environment 101 can process one or more queries 122 received from the client devices 105. The client device 105 can send queries 122 to the computing environment 101 to request particular information. For example, a particular query 122 can include a textual input requesting how to receive a refund for tickets purchased for a particular sporting event. In this particular scenario, the computing environment 101 can identify a particular prewritten response and various sample queries for answering this type of query (e.g., a query requesting refund policies). The computing environment 101 can process the query 122 by tokenizing the query 122 and generating vector embeddings for each token extracted from the query 122. For example, the computing environment 101 can process the query 122 by generating tokens for each word of the particular query 122. The computing environment 101 can generate vector embeddings for each token of the query 122. By generating vector embeddings for each token of the query 122, The computing environment 101 can calculate multi-dimensional distances between each vector embedding of the query 122 and vector embeddings of the sample queries stored in the data store 211. The computing environment 101 can include various threshold parameters that, when met, can indicate a match between the query 122 and one or more of the sample queries. For example, the threshold parameter can include a minimum multi-dimensional distance that, when met, can indicate that the query 122 is substantially similar to the sample queries. On meeting the threshold parameter, the computing environment 101 can respond to the query 122 by sending to the client device 105 a query response 123 (e.g., the prewritten response, the hybrid response) associated with the sample queries.

In a scenario where the query 122 does not meet the threshold parameter, the computing environment 101 can be configured to generate a response stating that the system is incapable of answering the query 122 and/or employ the LLM to generate a particular generated response. For example, on identifying that the threshold parameter was not met, the computing environment 101 can employ the LLM to process the query 122 and produce the generated response. The computing environment 101 can send the client device 105 the generated response as the query response 123.

The computing environment 101 can augment the LLM with entity-specific documents along with the query 122 when generating the generated response. For example, the computing environment 101 can receive from the entity device 103 and/or the external resources 107 one or more policy documents regarding return policies. The computing environment 101 can vectorize the policy documents and feed the vector embeddings of the policy documents to the LLM along with the query 122. The LLM can employ the policy documents and the query 122 to generate a particular generated response. By using the policy documents, the computing environment 101 can generate more accurate responses that are based on the entity's actual policies instead of a training corpus of the particular LLM. In a scenario where the computing environment 101 does not have access to the entity-specific documents, the computing environment 101 can data scrape the external resources 107 distributed across the network 109 to potentially identify pertinent information associated with the query 122.

The client device 105 can send subsequent queries 122 to the computing environment 101 to request any information from the computing environment 101. The computing environment 101 can repeat the analysis of each subsequent query 122 to provide pertinent query responses 123 to the client device 105.

Referring now to FIG. 2, illustrated is the networked environment 200, according to one example of the disclosed technology. The networked environment 200 can include various systems used to perform the processes described by the workflow diagram 100 and other potential processes. The networked environment 200 can include the computing environment 101, the entity devices 103, the client devices 105, and the external resources 107, all of which can be in data communication across the network 109.

The computing environment 101 can include, for example, a server computer or any other system providing computing capability. Alternatively, the computing environment 101 can employ more than one computing device that can be arranged, for example, in one or more server banks or computer banks or other arrangements. Such computing devices can be located in a single installation or can be distributed among many different geographical locations. For example, the computing environment 101 can include one or more computing devices that together can include a hosted computing resource, a grid computing resource, and/or any other distributed computing arrangement. In some cases, the computing environment 101 can correspond to an elastic computing resource where the allotted capacity of processing, network, storage, or other computing-related resources can vary over time.

The data stored in the data store 211 can include, for example, a list of data, and potentially other data. Also, various data can be stored in the data store 211 that can be accessible to the computing environment 101. The data store 211 can be representative of one or more of data stores 211 as can be appreciated. The data stored in the data store 211, for example, can be associated with the operation of the various applications and/or functional entities described in further detail herein. The data store 211 can function as the central data server for the networked environment 200. For example, the data store 211 can store all data received from the entity devices 103, the client devices 105, the external resources 107, and/or any other system distributed across the network 109. The data store 211 can include data modules that store specific types of data. For example, the data modules can include but are not limited to configuration data 231, query data 233, model data 235, vectorized data 237, entity data 239, response data 241, and historical data 243. Though discussed as separate modules, the data store 211 can share data across one or more modules.

The configuration data 231 can include any configuration requests 121 sent by the entity devices 103 to the computing environment 101. The configuration data 231 can include but is not limited to prewritten responses, hybrid responses, one or more sample queries, training data, entity-specific documents, a language type, content group information, content type information, a response name, a channel name, a volume name, and/or a request to generate the entire response. The configuration data 231 can group or partition data based on each particular query response 123. For example, a particular configuration request 121 can include configuration details specific to one query response 123 (e.g., prewritten response, hybrid response). Continuing this example, the configuration data 231 can group each configuration request 121 such that each component of the configuration request 121 is associated with the data store 211. The configuration data 231 can be associated with specific entity devices 103. For example, the configuration data 231 can be partitioned into subsets of data that pertain to specific entity devices 103.

The query data 233 can include any particular query 122 generated by the client devices 105 and sent to the computing environment 101. The query data 233 can include query text for each particular query 122 received from the client devices 105. The query text can include natural language that requests some form of information associated with a particular entity. For example, a particular query 122 can include the query text, "What is the return policy for tickets purchased less than 24 hours ago?" The query data 233 can associate each query 122 with the query 122's corresponding client device 105 such that the query 122 is traced back to the appropriate client device 105. Though discussed in the context of query texts, the query 122 can include any form of natural language. For example, the query 122 can include natural language present in audio recordings (e.g., spoken language) and/or natural language present in video recordings (sign language, captions, subtitles).

The model data 235 can include any information used to process, train, and implement machine learning models/algorithms, artificially intelligent systems, deep learning models (e.g., neural networks), LLMs, and/or natural language processing systems. Non-limiting examples of models stored in the model data 235 can include topic modelers, neural networks, linear regression, logistic regression, ordinary least squares regression, stepwise regression, multivariate adaptive regression splines, ridge regression, least-angle regression, locally estimated scatterplot smoothing, decision trees, random forest classification, support vector machines, Bayesian algorithms, hierarchical clustering, k-nearest neighbors, K-means, expectation maximization, association rule learning algorithms, learning vector quantization, self-organizing map, locally weighted learning, least absolute shrinkage and selection operator, clastic net, feature selection, computer vision, dimensionality reduction algorithms, gradient boosting algorithms, and combinations thereof. Neural networks can include but are not limited to uni-layer or multilayer perceptron, convolutional neural networks, recurrent neural networks, long short-term memory networks, auto-encoders, deep Boltzmann machines, deep belief networks, back-propagations, stochastic gradient descents, Hopfield networks, and radial basis function networks. The model data 235 can include one or more models stored in the model data 235 of varying or similar composition or function.

The models stored in the model data 235 can include various properties that can be adjusted and optimized by the computing environment 101 during model training. The properties can include any parameter, hyperparameter, configuration, or setting of the model stored in the model data 235. Non-limiting examples of properties include coefficients or weights of linear and logistic regression models, weights and biases of neural network-type models, cluster centroids in clustering-type models, train-test split ratio, learning rate (e.g. gradient descent), choice of optimization algorithm (e.g., gradient descent, gradient boosting, stochastic gradient descent, Adam optimizer, XGBoost, etc.), choice of activation function in a neural network layer (e.g. Sigmoid, ReLU, Tanh, etc.), choice of value or loss function, number of hidden layers in a neural network, number of activation units (e.g., artificial neurons) in each layer of a neural network, drop-out rate in a neural network (e.g., dropout probability), number of iterations (epochs) in training a neural network, number of clusters in a clustering task, Kernel or filter size in convolutional layers, pooling size, and batch size.

The model data 235 can include one or more LLMs or similar natural language processing algorithms. The LLMs can be defined as one or more models trained on a large corpus of data to generate large-volume textual responses. The LLMs stored in the model data 235 can include various third-party LLMs, APIs for interfacing with one or more third-party LLMs, and/or custom-programmed LLMs. For example, the LLMs stored in the model data 235 can include GPT 3.0, GPT 3.5, GPT 4.0, BERT, LaMDA, and/or any other LLM system.

The model data 235 can include one or more tokenization and vector embedding algorithms. The tokenization algorithms (also referred to herein as tokenizers) can include one or more models for tokenizing a particular input into individual tokens. Tokens can be defined as words, phrases, sentences, and/or any combination of characters extracted from a body of text. For example, the statement, "How much are tickets for the Brooklyn Dodgers baseball game?" can include ten tokens for each word in the prior statement. The tokenization algorithms can include but are not limited to white space tokenization, Natural Language Toolkit (NLTK) word tokenizer, Textblob Word Tokenizer, spaCy Tokenizer, Gensim word tokenizer, Byte-Pair Encoding (BPE), WordPiece, SentencePiece, and/or any other algorithm that can tokenize a particular input. The vector embedding algorithms can include one or more models intended to embed each token with a respective vector equivalent. The vector embedding algorithms can include but are not limited to Word2Vec, Bag of Words model, Term Frequency-Inverse Document Frequency (TF-IDF) model, GloVe, FastText, Universal Sentence Encoder (USE), SkipThought, Doc2Vec, Paragraph Vectors, and/or any other model used to generate vector embeddings for tokens.

The model data 235 can include threshold parameters for assessing various characteristics of the queries 122 and other data stored in the data store 211. For example, the model data 235 can include a multi-dimensional distance threshold (also referred to herein as a threshold sensitivity distance). The multi-dimensional distance threshold can define a maximum distance between two or more vector embeddings that would indicate there are similarities between the vector embeddings. For example, the multi-dimensional distance threshold can be defined as a cosine similarity value (also referred to herein as a cosign similarity score) greater than 0.9. The computing environment 101 can calculate the cosine similarity score between two vectors. The computing environment 101 can score the two vectors as similar if their cosine similarity score is greater than or equal to a multi-dimensional distance threshold, for example, 0.9. The cosine similarity score can define a mathematical expression used to quantify the similarities between two vectors. The computing environment 101 can include a cosine similarity algorithm to calculate the cosine similarity scores between two or more vector embeddings. The model data 235 can include any other algorithm used to calculate similarities between vector embeddings and quantify the multi-dimensional distance threshold. For example, the model data 235 can include a simple distance algorithm used to calculate the multi-dimensional distance between two or more vector embeddings and generate an associated multi-dimensional distance threshold.

The vectorized data 237 can function as a vectorized database that can store vector embeddings generated for each token extracted from the query data 233, configuration data 231, and/or the entity data 239. For example, the vector embedding algorithms of the model data 235 can embed each token with a vector equivalent. Continuing this example, the vector equivalent can define a vector that maps the token to a unique position in a multi-dimensional space. By providing each token a vector equivalent, the computing environment 101 can compare tokens based on their proximity in the multi-dimensional space to determine how similar each token is to one another. The computing environment 101 can store each embedded vector associated with each token in the vectorized data 237 for further processing.

The entity data 239 can include any data received from and associated with one or more entity devices 103 interacting with the computing environment 101. The entity data 239 can include but is not limited to entity-specific documents, an entity name, an entity address, and/or associated entity devices 103. The entity data 239, for example, can include entity-specific documents received from the entity devices 103. The entity-specific documents can include any particular document that defines certain policies, practices, and/or any information associated with the entities. For example, the entity-specific documents can include user manuals, return policies, stadium maps, bag policies for sporting events, and/or any particular document that defines some form of information associated with the entities.

The response data 241 can include any particular response generated and/or distributed by the computing environment 101. The response data 241 can include any response received from the entity device 103 through the configuration request 121. The response data 241 can include, for example, the prewritten responses, the hybrid responses, the generated responses, the query responses 123, and/or any other response generated by the computing environment 101.

The historical data 243 can include any past queries, responses, and/or series of data communications performed between the client devices 105, the entity devices 103, and/or the computing environment 101. The historical data 243 can include, for example, various queries 122 and their associated query responses 123 performed between a particular client device 105 and the computing environment 101. The historical data 243 can store associated data linked to past data communications (e.g., associated responses, associated training data, associated queries, associated entity-specific documents, etc.). The historical data 243 can store prior conversations held between the client device 105 and the computing environment 101 for future reference. For example, the computing environment 101 can reference a particular query 122 received from a particular client device 105 against past conversations held with other client devices 105. Continuing this example, the computing environment 101 can identify, using vector embeddings, any past queries from the historical data 243 that are similar to the particular query 122 and use past generated responses to respond to the particular query 122. The computing environment 101 can employ the historical data 243 to flag responses that were inadequately responded to by the computing environment 101. The computing environment 101 can employ the historical data 243 to train various LLMs to generate particular responses.

Various applications and/or other functionalities can be executed in the computing environment 101. The components executed on the computing environment 101, for example, can include list of applications, and other applications, services, processes, systems, engines, or functionality discussed in further detail herein. The computing environment 101 can include a management service 213. The management service 213 can include a central computing resource used to perform all computational requirements of the computing environment 101. The management service 213 can include a management console 245 and a processing console 249.

The management console 245 can function as a data distribution resource of the computing environment 101. The management console 245 can, for example, store data in adequate modules within the data store 211, send data across the network 109, receive data from sources distributed across the network 109, generate periodic data requests from any particular system distributed across the network 109, and/or perform any other data distribution task of the computing environment 101. For example, the management console 245 can send the query responses 123 to the client devices 105. In another example, the management console 245 can generate weekly pull requests for entity-specific documents from the external resources 107. In another example, the management console 245 can receive configuration requests 121 from the entity devices 103.

The processing console 247 can function as the central computing resource of the computing environment 101. The processing console 247 can, for example, process the configuration requests 121, generate tokens and/or embedded vectors for processed data (e.g., query responses, training data, entity-specific documents), calculate distances between embedded vectors, determine similarities between embedded vectors based on the threshold parameters (e.g., the multi-dimensional distance threshold), employ LLMs stored in the model data 235 to produce generated sample queries, employ LLMs to generate responses to queries 122 based on the configuration data 231, vectorized data 237, and/or entity data 239, generate hybrid responses by running embedded code stored in the prewritten response, and/or perform any other particular process performed by the computing environment 101. These and other processes of the processing console 247 will be discussed in further detail herein.

The entity device 103 can be representative of one or more entity devices that can be coupled to the network 109. The entity device 103 can include, for example, a processor-based system such as a computer system. Such a computer system can be embodied in the form of a desktop computer, a laptop computer, personal digital assistants, cellular telephones, smartphones, set-top boxes, music players, smart glasses, web pads, tablet computer systems, game consoles, electronic book readers, or other devices with like capability. The entity device 103 can include a display 215. The display 215 can include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The entity device 103 can be configured to execute various applications such as an entity application 223 and/or other applications. The entity application 223 can be executed by the entity device 103, for example, to access network content served up by the computing environment 101 and/or other servers, thereby rendering a first user interface 400 (see FIG. 5), a second user interface 500 (see FIG. 6), and/or a third user interface 600 (see FIG. 7) on the display 215. To this end, the entity application 223 can include, for example, a browser, a dedicated application, etc. The entity device 103 can execute applications beyond the entity application 223 such as, for example, email applications, social networking applications, word processors, spreadsheets, and/or other applications.

The entity application 223 can function as an interface for sending configuration requests 121 from the entity devices 103 to the computing environment 101. The entity application 223 can employ various user interfaces (e.g., the first user interface 400, the second user interface 500, the third user interface 600) to render one or more input fields for requesting information. The entity device 103 can employ one or more input devices 225 to receive inputs through the input fields. The input devices 225 can include, for example, a touchscreen, a keyboard, a mouse, a microphone, a camera, and/or any other input device used to generate inputs. The entity application 223 can employ the input devices 225 to receive inputs associated with the configuration request 121. For example, the entity application 223 can include one or more text input fields. Continuing this example, the entity application 223 can receive text for a particular prewritten response through the keyboard. The entity application 223 can store the prewritten response in a data store 221. The entity application 223 can receive, through the input fields, any particular input pertaining to the configuration requests 121. On receiving all inputs through the input devices 225, the entity application 223 can send the configuration request 121 to the management console 245 of the computing environment 101.

The data store 221 can function as a local data storage for the entity devices 103. The data store 221 can be substantially similar to the data store 211. For example, the data store 221 can mirror all data stored in the data store 211. In another example, the data store 221 can function as a remote data storage component of the data store 211. The data store 221 can include data exclusive to the entity device 103. For example, the data store 221 can include data that is only stored locally on the specific entity device 103.

The client device 105 can be representative of one or more client devices that can be coupled to the network 109. The client device 105 can include, for example, a processor-based system such as a computer system. Such a computer system can be embodied in the form of a desktop computer, a laptop computer, personal digital assistants, cellular telephones, smartphones, set-top boxes, music players, web pads, tablet computer systems, game consoles, electronic book readers, or other devices with like capability. The client device 105 can include a display 261. The display 261 can include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 105 can be configured to execute various applications such as a client application 263 and/or other applications. The client application 263 can be executed by the client device 105, for example, to access network content served up by the computing environment 101 and/or other servers. To this end, the client application 263 can include, for example, a browser, a dedicated application, etc., and can include a network page, an application screen, etc. The client device 105 can execute applications beyond the client application 263 such as, for example, email applications, social networking applications, word processors, spreadsheets, and/or other applications.

The client application 263 can facilitate communications between the client device 105 and the computing environment 101. For example, the client application 263 can include a client user interface. The client user interface can include one or more communication platforms for conducting communications between the client device 105 and the computing environment 101. For example, the communication platform of the client user interface can include a chatbox. The client application 263 can receive through the chatbox one or more queries 122. The client application 263 can employ one or more input devices 265 to receive inputs through the chatbox. The input devices 265 can include but are not limited to a touchscreen, a keyboard, a mouse, a microphone, a camera, and/or one or more sensors. The client application 264 can, for example, receive through a keyboard the query text of the query 122. The client application 263 can employ the chatbox to render the query response 123 on the display 261. For example, the client application 263 can receive from the computing environment 101 the query response 123 and can render the query response 123 in the chatbox.

Each client device 105 can include device-specific client applications 263. For example, a first client device 105, which can include a cellphone, can include a cellphone-specific client application 263. Continuing this example, a second client device, which can include a laptop, can include a laptop-specific client application 263. By having distinct client applications 263, the computing environment 101 can generate responses that are device-specific. For example, the management console 245 can identify the type of client device 105 based on a communication protocol, a data trigger stored in and transmitted through the query 122, the client application 263, and/or information associated with the client device 105. On identifying the type of client device 105 and client application 263, the computing environment 101 can cater query responses 123 to particular formats associated with the type of client device 105 and client application 263. For example, the computing environment 101 can generate query responses for ticketing information differently for cellphone client devices 105 as compared to laptop client devices 105 due to the different ticket rendering procedures employed by the respective client devices 105.

Next, a general description of the operation of the various components of the networked environment 200 is provided. To begin, the entity device 103 can send configuration requests 121 with information defining associated communication channels. A communication channel can define a mode of communication established between the computing environment 101 and the client devices 105. For example, communication channels can include but are not limited to mobile application channels, website channels, and text message channels. The entity device 103 can include particular communication channels such that the computing environment 101 can select the query response 123 that shares similar communication channels to the particular query 122. For example, the computing environment 101 can process a particular query 122 using a natural language processing algorithm from the model data 235, where the natural language processing algorithm can be configured to identify communication channels associated with the particular query 122. Continuing this example, on identifying the associated communication channel of the query 122, the processing console 247 can identify one or more response entries stored in the configuration data 231 that share similar communication channels with the query 122.

The processing console 247 can process the set of query text extracted from the query 122 using a natural language processing algorithm from the model data 235 to identify an intent associated with the query 122. In a scenario where the intent is not associated with the query 122, the processing console 247 can generate the vector representation for the set of query text.

Figure 3:
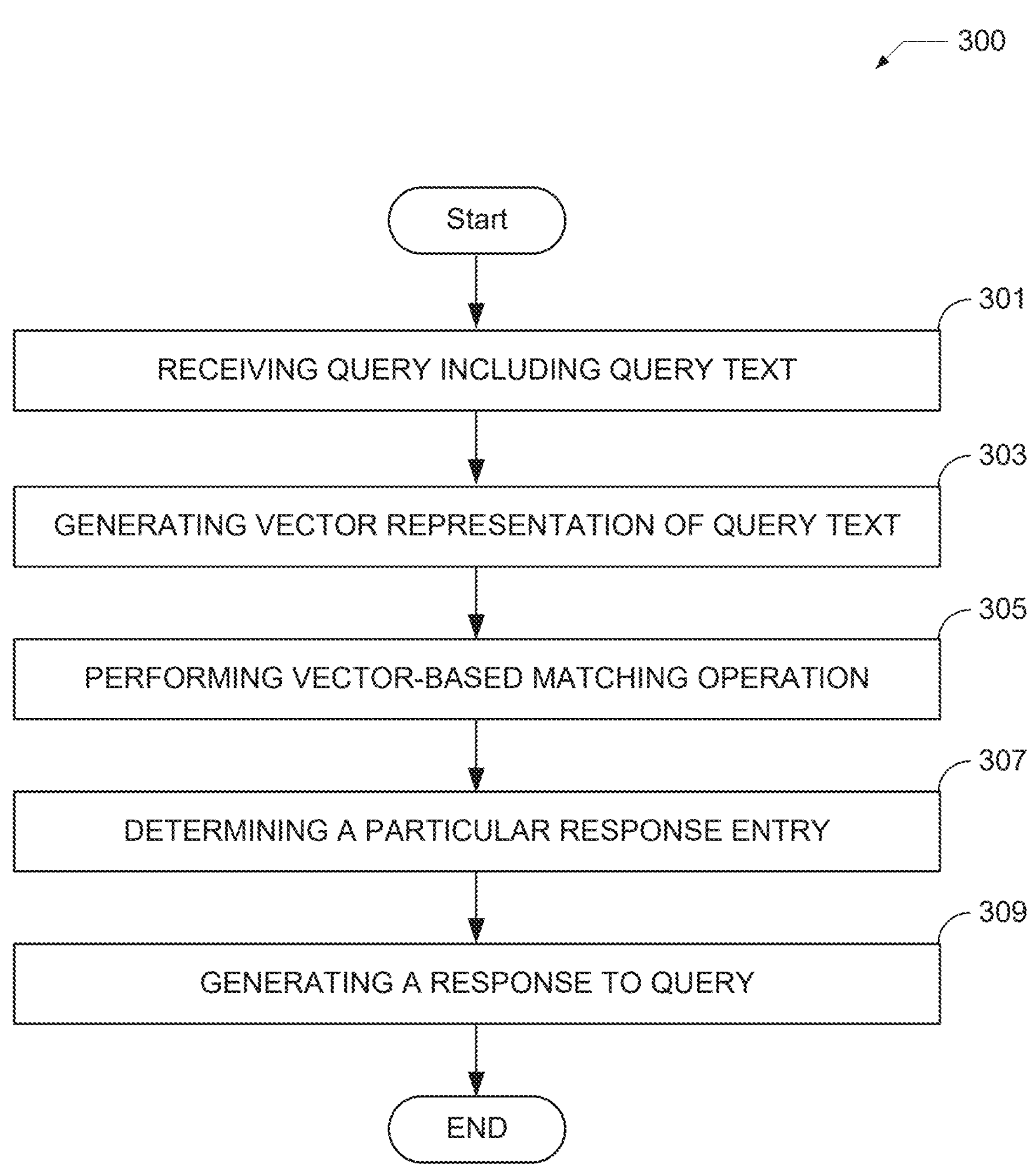
FIG. 3 illustrates a flowchart of a process, according to one example of the disclosed technology.

Referring now to FIG. 3, illustrated is a flowchart of a process 300, according to one example of the disclosed technology. The process 300 can demonstrate a technique for generating the query response 123 based on the query 122. Though illustrated in a particular order, the boxes of the process 300 can be performed in any particular order. The process 300 can be executed by any particular system distributed across the networked environment 200.

At box 301, the process 300 can include receiving the query 122, including a set of query text. The computing environment 101 can receive the query 122, including the set of query text. The client device 105 can receive through the client application 263 the set of query text. For example, the client device 105 can interface with a keyboard that can input the set of query text into the chatbox of the client application 263. The set of query text can include natural language that requests information from the computing environment 101. For example, the set of query text can include ten words, where the ten words form the statement, "Where can I find the box office at the stadium?" On completion of the set of query text, the client device 105 can employ the client application 263 to interface with the computing environment 101. Through the client application 263, the client device 105 can send the computing environment 101 the query 122 along with the set of query text. The computing environment 101 can store the query 122 in the query data 233 using the management console 245.

At box 303, the process 300 can include generating a vector representation of the set of query text. The computing environment 101 can generate vector representations (e.g., vector embeddings) for the set of query text. The processing console 247 can employ the tokenization algorithms to tokenize each word within the set of query text. On tokenizing each word of the set of query text, the processing console 247 can employ any particular vector embedding algorithm to generate vector embeddings for each token.

At box 305, the process 300 can include performing a vector-based matching operation on the vector representation of the set of query text against one or more response entries stored in the data store 211. The computing environment 101 can perform the vector-based matching operation on the vector representation of the set of query text against one or more response entries stored in the data store 211. The vector-based matching operation can define one or more techniques performed by the processing console 247 for determining the similarity between two or more vector embeddings. In one example, the processing console 247 can perform the vector-based matching operation by calculating the cosine similarity score for each vector embedding generated for the set of query text against each vector embedding generated for a particular response entry (e.g., prewritten response, hybrid response) stored in the vectorized data 237. Continuing this example, the processing console 247 can average the cosine similarities to determine an overall cosine similarity score. The processing console 247 can continually generate cosine similarity scores for the set of query text as it compares to each of the response entries stored in the vectorized data 237. In another example, the processing console 247 can perform a distance calculation as the vector-based matching operation. The processing console 247 can calculate the distance between each vector embedding of the set of query text and each vector embedding associated with the particular response entry. The processing console 247 can average the distances calculated between the vector embeddings of the set of query text and the vector embeddings of the particular response entry to generate a vector distance score. The processing console 247 can generate various vector distance scores for the set of query data as measured against each response entry stored in the vectorized data 237.

At box 307, the process 300 can include determining the particular response entry to use for the query 122 based on the vector-based matching operation. The computing environment 101 can determine the particular response entry to use for the query 122 based on the vector-based matching operation. The processing console 247 can employ the vector distance score, cosine similarity score, and/or any other score generated from the vector-based matching operation to determine the particular response entry to use for responding to the query 122. The processing console 247 can compare the score generated from the vector-based matching operation to the threshold parameter to determine if the particular response entry satisfies the threshold parameter. For example, when using the vector distance score, the processing console 247 can select the particular response entry that includes a vector distance score less than (or less than or equal to) the multi-dimensional distance threshold. In a scenario where there are two or more response entries that satisfy the threshold parameter (e.g., the multi-dimensional distance threshold), the processing console 247 can select the response entry with the highest matching score as measured against the threshold parameter.

At box 309, the process 300 can include generating the query response 123 to the query 122 based on the particular response entry. The processing console 247 can generate the query response 123 to the query 122 based on the particular response entry. For example, if the particular response entry is a prewritten response, the processing console 247 can extract the prewritten response from the configuration data 231. The processing console 247 can send the client device 105 the prewritten response as the query response 123. In another example, if the particular response entry is a hybrid response, the processing console 247 can process the hybrid response and execute the code that dictates the generated portions of the hybrid response. The processing console 247 can execute the code that dictates the generated portions of the hybrid response by employing one or more LLMs from the model data 235. The LLM can parse through the hybrid response and execute the code embedded into the hybrid response. The LLM can generate natural language in accordance with the code. The processing console 247 can subsequently replace the code of the hybrid response with the natural language generated by the processing console 247 and through the LLM. The processing console 247 can send the hybrid response as the query response 123 to the client device 105. In yet another example, the processing console 247 can generate the entire response to produce the generated response. In a scenario where no response entry is specified for the query 122, the processing console 247 can employ the LLM to process the query 122 and/or any associated documents (if applicable) and produce the generated response. The processing console 247 can send the generated response to the client device 105 as the query response 123.

Figure 4:
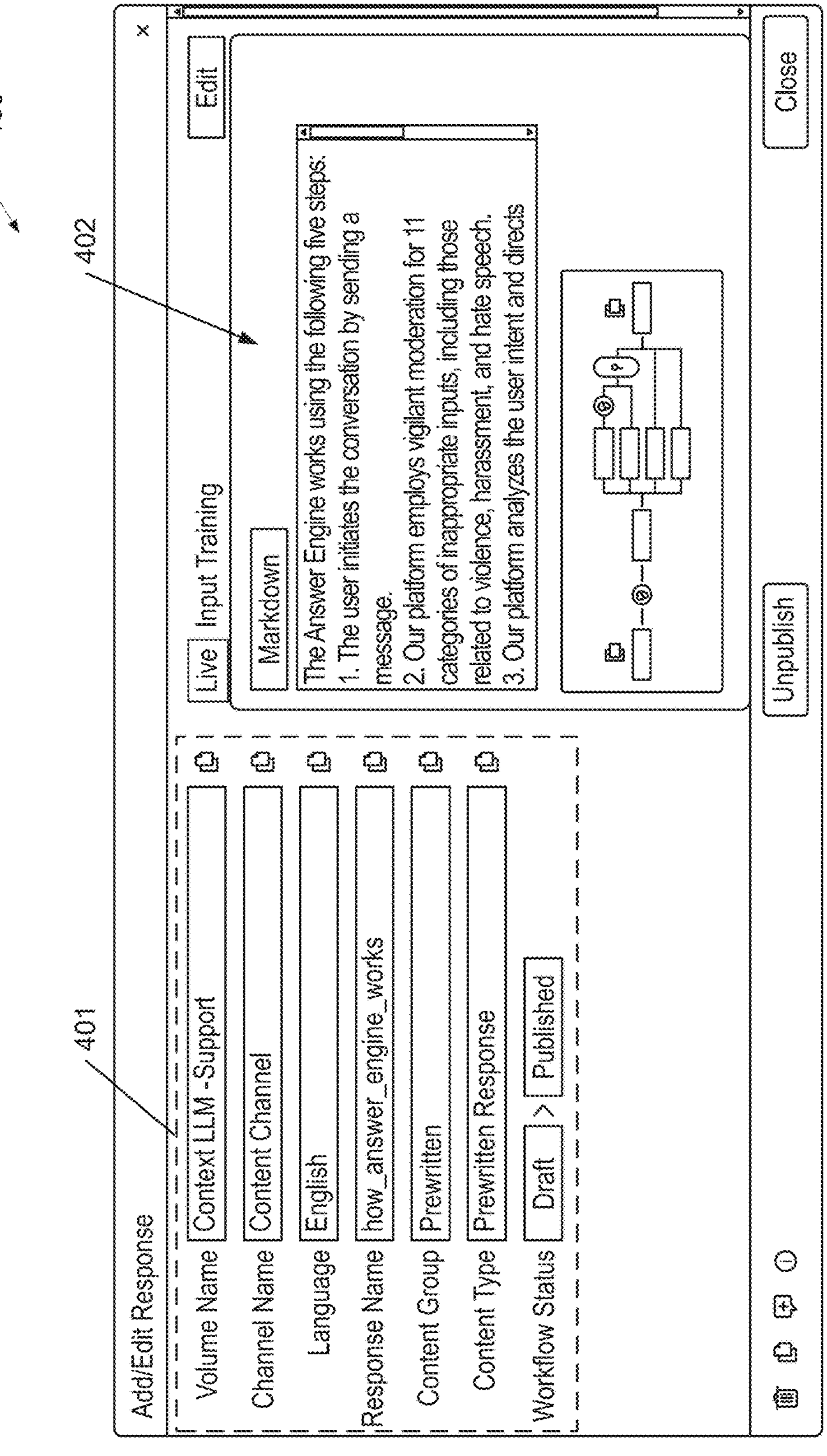
FIG. 4 illustrates a first user interface of a client application, according to one example of the disclosed technology.

Referring now to FIG. 4, illustrated is the first user interface 400, according to one example of the disclosed technology. The entity device 103 can render the first user interface 400 through the entity application 223. The first user interface 400 can exemplify a user interface for generating the configuration request 121 with a particular prewritten response 402. The first user interface 400 can include one or more configuration parameters 401. The configuration parameters 401 can function as components of the configuration request 121 and can define various aspects of the particular prewritten response 402. The configuration parameters 401 can include but are not limited to, volume name, channel name, language, response name, content group, content type, and/or a workflow status. The entity device 103 can receive through the input device 225 and the entity application 223 the particular prewritten response 402. For example, the first user interface 400 rendered through the entity application 223 can receive from the particular input device 225 the particular prewritten response 402.

Figure 5:
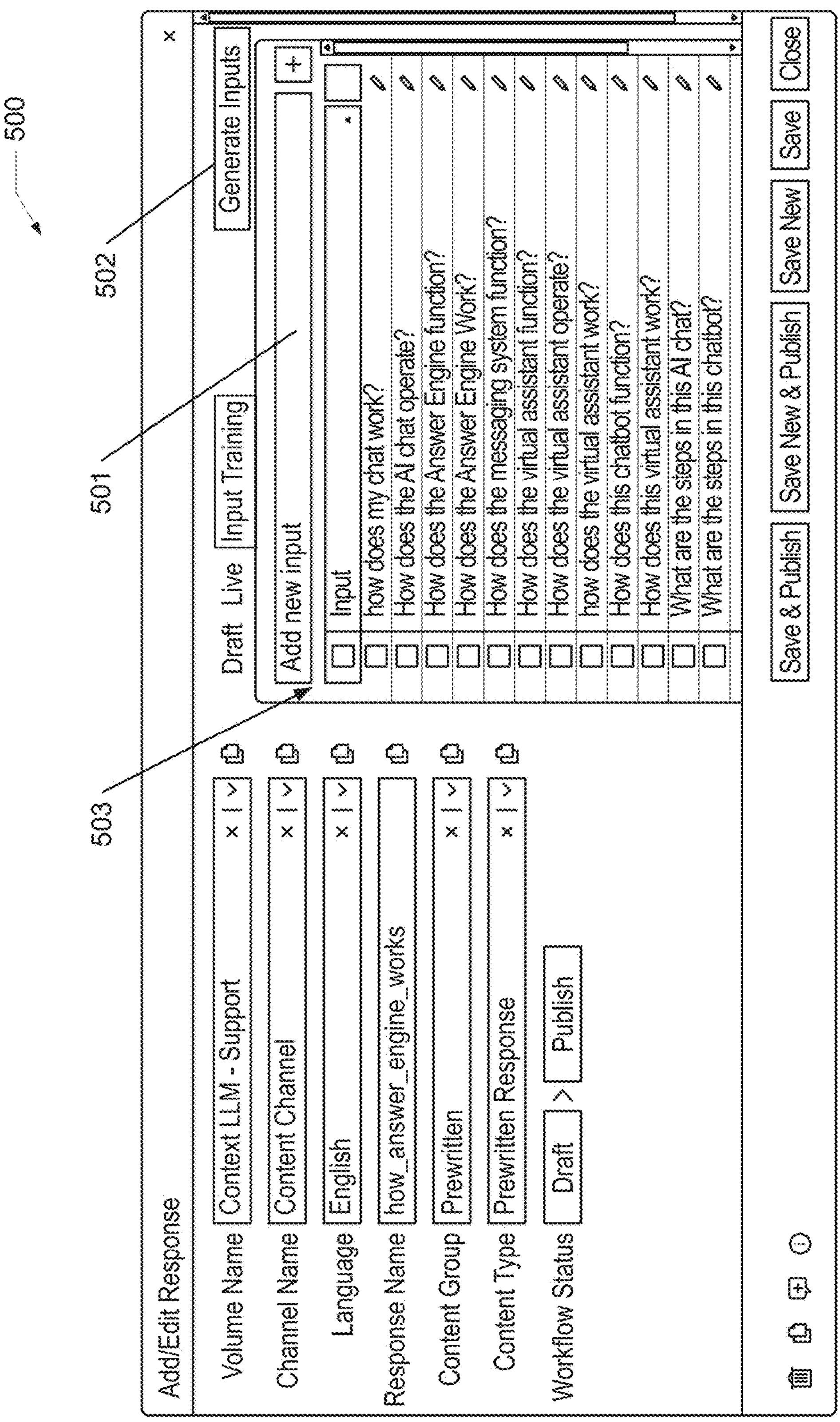
FIG. 5 illustrates a second user interface of the client application, according to one example of the disclosed technology.

Referring now to FIG. 5, illustrated is the second user interface 500, according to one example of the disclosed technology. The entity device 103 can render the second user interface 500 through the entity application 223. The second user interface 500 can exemplify a user interface for inputting prewritten sample queries and producing generated sample queries. The second user interface 500 can include a sample query input field 501. The sample query input field 501 can function as a text input box used to receive prewritten sample queries. For example, the sample query input field 501 can receive text generated from one or more input devices 225. The entity device 103 can store the text received through the sample query input field 501 as one or more prewritten sample queries. The second user interface 500 can include a sample query generation option 502. The sample query generation option 502 when triggered can initiate the production of generated sample queries. For example, when triggered, the computing environment 101 can employ the LLM to process the prewritten sample queries and/or the prewritten response and generate one or more generated sample queries. The second user interface 500 can list all the sample queries. The second user interface 500 can include a selection filter 503, such that the entity can select the sample queries that elicit the associated response. For example, the entity device 103 can send the selected sample queries with the associated prewritten response to the computing environment 101 through the configuration request 121. The computing environment 101 can utilize the selected sample queries and the prewritten response to analyze queries 122 received from the client device 105.

Figure 6:
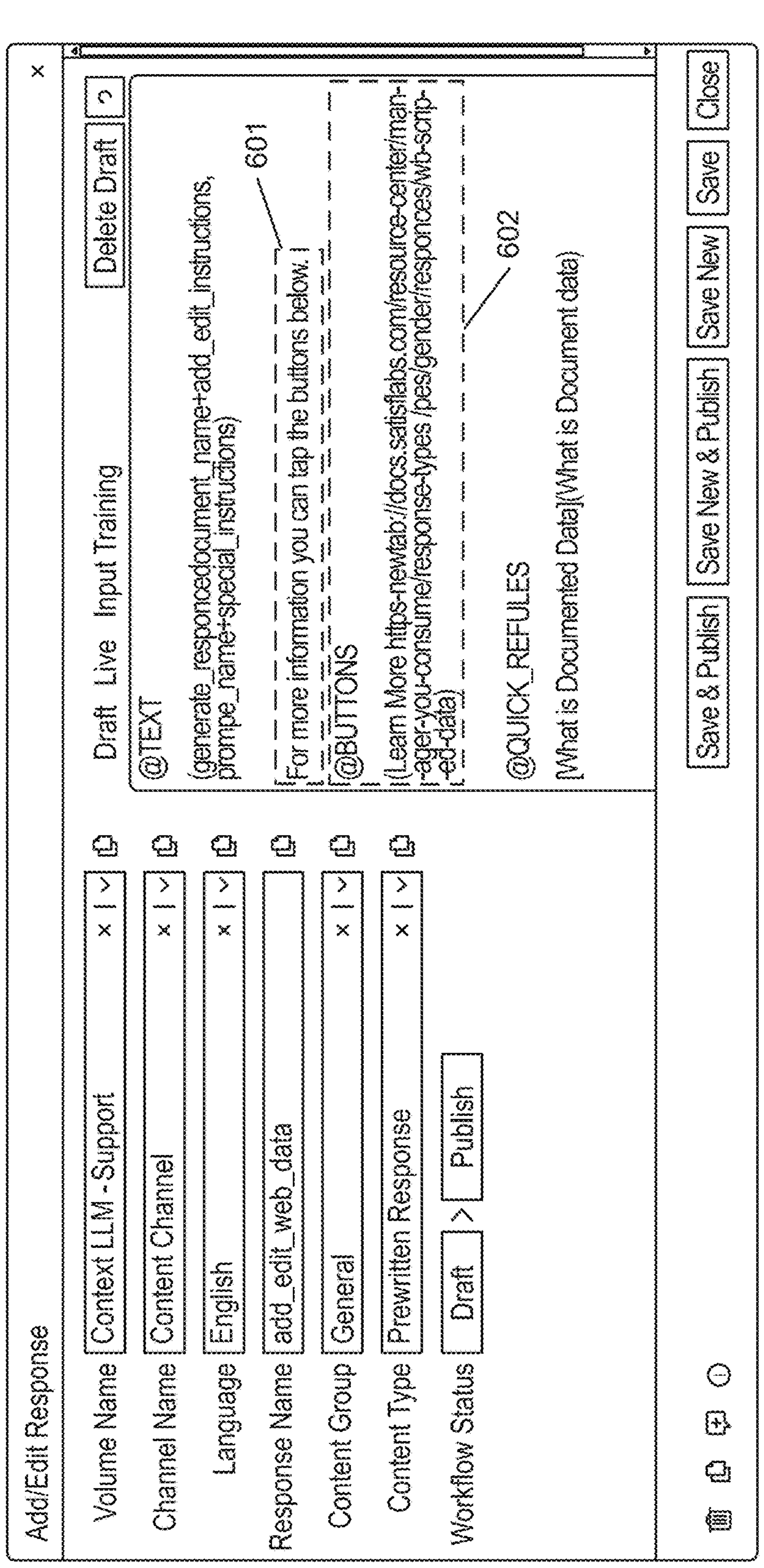
FIG. 6 illustrates a third user interface of the client application, according to one example of the disclosed technology.

Referring now to FIG. 6, illustrated is the third user interface 600, according to one example of the disclosed technology. The entity device 103 can render the third user interface 600 through the entity application 223. The third user interface 600 can exemplify a user interface for configuring hybrid responses. The third user interface 600 can include a text input field that allows for the input of prewritten text 601 and code 602. For example, the entity device 103 can receive through the text input field one or more portions of prewritten text 601 and one or more portions of code 602, all of which combine to form the hybrid response. The prewritten text 601 can define some form of written information that pertains to a particular query 122. The code 602 can define code that, when executed by the LLM, a natural language processing system, and/or the processing console 247, can generate natural language or some form of data to augment the hybrid response. For example, the code 602 can include meta data used by the processing console 247 to generate a button and embed the button into the hybrid response. In some embodiments, one or more button or response component can be embedded into the hybrid response by generating a response in hypertext markup language (HTML) format and inserting code for a button into the HTML code. In other embodiments, the button can be embedded into the hybrid response by generating code representing the intended message, such as Rich Text Format (RTF) or other a proprietary format. In some embodiments, the processing console 247 can insert text into a prewritten text 601 to generate a hybrid response.

From the foregoing, it will be understood that various aspects of the processes described herein are software processes that execute on computer systems that form parts of the system. Accordingly, it will be understood that various examples of the system described herein are generally implemented as specially-configured computers, including various computer hardware components and, in many cases, significant additional features as compared to conventional or known computers, processes, or the like, as discussed in greater detail herein. Examples within the scope of the present disclosure also include computer-readable media for carrying or having computer-executable instructions or data structures stored thereon. Such computer-readable media can be any available media that can be accessed by a computer or downloadable through communication networks. By way of example, and not limitation, such computer-readable media can include various forms of data storage devices or media such as RAM, ROM, flash memory, EEPROM, CD-ROM, DVD, or other optical disk storage, magnetic disk storage, solid-state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general-purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions can include, for example, instructions and data that cause a general-purpose computer, special-purpose computer, or special-purpose processing device such as a mobile device processor to perform one specific function or a group of functions.

Those skilled in the art will understand the features and aspects of a suitable computing environment in which aspects of the disclosure may be implemented. Although not required, some of the examples of the claimed innovations may be described in the context of computer-executable instructions, such as program modules or engines, as described earlier, being executed by computers in networked environments. Such program modules are often reflected and illustrated by flow charts, sequence diagrams, example screen displays, and other techniques used by those skilled in the art to communicate how to make and use such computer program modules. Generally, program modules include routines, programs, functions, objects, components, data structures, and application programming interface (API) calls to other computers, whether local or remote, etc., that perform particular tasks or implement particular defined data types within the computer. Computer-executable instructions, associated data structures and/or schemas, and program modules represent examples of the program code for executing steps of the methods disclosed herein. The particular sequence of such executable instructions or associated data structures represents examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Examples of the claimed innovation are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically include one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language, or other input devices (not shown), such as a microphone, etc. These and other input devices are often connected to the processing unit through known electrical, optical, or wireless connections.

The computer that affects many aspects of the described processes will typically operate in a networked environment using logical connections to one or more remote computers or data sources, which are described further below. Remote computers may be another personal computer, a server, a router, a network PC, a peer device, or other common network nodes, and typically include many or all of the elements described above relative to the main computer system in which the innovations are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the innovation is connected to the local network through a network interface or adapter. When used in a WAN or WLAN networking environment, the computer may include a modem, a wireless link, or other mechanisms for establishing communications over the wide-area network, such as the Internet. In a networked environment, program modules depicted relative to the computer, or portions thereof, may be stored in a remote data storage device. It will be appreciated that the network connections described or shown as examples and other mechanisms of establishing communications over wide area networks or the Internet may be used.

While various aspects have been described in the context of a preferred example, additional aspects, features, and methodologies of the claimed innovations will be readily discernible from the description herein by those of ordinary skill in the art. Many examples and adaptations of the disclosure and claimed innovations, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed innovations. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed innovations. In addition, some steps may be carried out simultaneously, contemporaneously, or in synchronization with other steps.

Clause 1. A system, comprising: a data store; and at least one computing device in communication with the data store, wherein the at least one computing device is configured to: receive a query comprising a set of query text; generate a vector representation of the set of query text; performing a vector-based matching operation on the vector representation of the set of query text against a plurality of response entries stored in the data store; determine a particular response entry to use for the query based on the vector-based matching operation; and generate a response to the query based on the particular response entry.

Clause 2. The system of clause 1 or any other clause herein, wherein the at least one computing device is further configured to determine the particular response entry as a most relevant response of the plurality of response entries based on determining a multi-dimensional distance between the vector representation of the set of the query text and the particular response entry is less than a plurality of other multi-dimensional distances between the vector representation of the set of the query text and each other ones of the plurality of response entries stored in the data store.

Clause 3. The system of clause 1 or any other clause herein, wherein the at least one computing device is further configured to determine the particular response entry based on determining that a multi-dimensional distance between the vector representation of the set of the query text and the particular response entry is less than or equal to a predefined threshold sensitivity distance.

Clause 4. The system of clause 1 or any other clause herein, wherein the at least one computing device is further configured to: identify a plurality of codes in the particular response entry; determine a respective type of each of the plurality of codes; determine a respective value for each of the plurality of codes based on the respective type; and generate the response to the query by replacing each of the plurality of codes with the respective value.

Clause 5. The system of clause 4 or any other clause herein, wherein the at least one computing device is further configured to determine the respective value for a particular code of the plurality of codes for a particular type by querying a large language model based on the particular code.

Clause 6. The system of clause 1 or any other clause herein, wherein the at least one computing device is further configured to: receive a second query comprising a set of second query text; generate a second vector representation the set of second query text; performing the vector-based matching operation on the second vector representation of the set of query text against the plurality of response entries in stored in the data store; determine that all of the plurality of response entries fall outside of a predetermined distance from the second vector representation of the set of query text; and in response to determining that all of the plurality of response entries fall outside of the predetermined distance, generate a response to the second query based on querying a large language model based on the second query.

Clause 7. A method, comprising: receiving, via one of one or more computing devices, a query comprising a set of query text; generating, via one of the one or more computing devices, a vector representation of the set of query text; performing, via one of the one or more computing devices, a vector-based matching operation on the vector representation of the set of query text against a plurality of response entries; determining, via one of the one or more computing devices, a particular response entry to use for the query based on the vector-based matching operation; and generating, via one of the one or more computing devices, a response to the query based on the particular response entry.

Clause 8. The method of clause 7 or any other clause herein, further comprising: processing, via one of the one or more computing devices, the set of query language via a natural language processing algorithm to identify at least one context corresponding to the query; and identifying, via one of the one or more computing devices, a particular channel for the query of a plurality of channels based on the at least one context, wherein the plurality of response entries are associated with the particular channel.

Clause 9. The method of clause 8 or any other clause herein, wherein the plurality of channels comprise at least one of: a mobile application channel, a website channel, or a text message channel.

Clause 10. The method of clause 7 or any other clause herein, further comprising processing, via one of the one or more computing devices, the set of query text via a natural language processing algorithm to determine whether an intent is associated with the query, wherein the vector representation of the set of query text is generated in response to the intent not being associated with the query.

Clause 11. The method of clause 7 or any other clause herein, further comprising applying, via one of the one or more computing devices, a filter to the query.

Clause 12. The method of clause 7 or any other clause herein, further comprising: generating, via one of the one or more computing devices, at least one user interface comprising a plurality of text entry fields; receiving, via one of the at least one user interface, at least one input query from a first one of the plurality of text entry fields; generating, via one of the one or more computing devices, an input set based on the at least one input query; and performing, via one of the one or more computing devices, a vectorization process on the input set to generate the particular response entry.

Clause 13. The method of clause 12 or any other clause herein, wherein the input set comprises at least one generated input query generated using an artificial intelligence algorithm on the at least one input query.

Clause 14. The method of clause 12 or any other clause herein, further comprising receiving, via one of the at least one user interface, a prewritten response corresponding to the input set from a second one of the plurality of text entry fields, wherein the particular response entry comprises the prewritten response and the response to the query is further generated based on the prewritten response.

Clause 15. A non-transitory computer-readable medium embodying a program that, when executed by at least one computing device, causes the at least one computing device to: receive a query comprising a set of query text; generate a vector representation of the set of query text; performing a vector-based matching operation on the vector representation of the set of query text against a plurality of response entries; determine a particular response entry to use for the query based on the vector-based matching operation; and generate a response to the query based on the particular response entry.

Clause 16. The non-transitory computer-readable medium of clause 15 or any other clause herein, wherein the program further causes the at least one computing device to: receive a plurality of queries comprising the query; and apply a set of filters to the plurality of queries to filter out a subset of the plurality of queries.

Clause 17. The non-transitory computer-readable medium of clause 15 or any other clause herein, wherein the program further causes the at least one computing device to: generate a snippet based on a code in the response to the query; and generate the response by embedding the snippet in the response at the code.

Clause 18. The non-transitory computer-readable medium of clause 15 or any other clause herein, wherein the program further causes the at least one computing device to generate the response by embedding a button in the response at a particular code based on meta data in the code.

Clause 19. The non-transitory computer-readable medium of clause 15 or any other clause herein, wherein the program further causes the at least one computing device to generate the response to the query by: parsing a prewritten response of the particular response entry to determine a code in the prewritten response; identifying a value of a property associated with the code; and generating the response by replacing the code with the value.

Clause 20. The non-transitory computer-readable medium of clause 19 or any other clause herein, wherein the program further causes the at least one computing device to identify the value of the property by querying an application programming interface (API) associated with a type of the code.

The examples were chosen and described in order to explain the principles of the claimed innovations and their practical application so as to enable others skilled in the art to utilize the innovations and various examples and with various modifications as are suited to the particular use contemplated. Alternative examples will become apparent to those skilled in the art to which the claimed innovations pertain without departing from their spirit and scope. Accordingly, the scope of the claimed innovations is defined by the appended claims rather than the foregoing description and the examples described therein.

The invention claimed is:

1. A system, comprising:

a data store; and at least one computing device in communication with the data store, wherein the at least one computing device is configured to:

receive a query comprising a set of query text;

generate a vector representation of the set of query text;

performing a vector-based matching operation on the vector representation of the set of query text against a plurality of response entries stored in the data store;

determine a particular response entry to use for the query based on the vector-based matching operation;

identify a plurality of codes in the particular response entry;

determine a respective type of each of the plurality of codes;

determine a respective value for each of the plurality of codes based on the respective type, wherein a particular code of the plurality of codes for a particular type is determined by querying a large language model based on the particular code; and generate a response to the query based on the particular response entry by replacing each of the plurality of codes with the respective value.

2. The system of claim 1, wherein the at least one computing device is further configured to determine the particular response entry as a most relevant response of the plurality of response entries based on determining a multi-dimensional distance between the vector representation of the set of the query text and the particular response entry is less than a plurality of other multi-dimensional distances between the vector representation of the set of the query text and each other ones of the plurality of response entries stored in the data store.

3. The system of claim 1, wherein the at least one computing device is further configured to determine the particular response entry based on determining that a multi-dimensional distance between the vector representation of the set of the query text and the particular response entry is less than or equal to a predefined threshold sensitivity distance.

4. The system of claim 1, wherein the at least one computing device is further configured to:

receive a second query comprising a set of second query text;

generate a second vector representation the set of second query text;

performing the vector-based matching operation on the second vector representation of the set of query text against the plurality of response entries in stored in the data store;

determine that all of the plurality of response entries fall outside of a predetermined distance from the second vector representation of the set of query text; and in response to determining that all of the plurality of response entries fall outside of the predetermined distance, generate a response to the second query based on querying a large language model based on the second query.

5. A method, comprising:

receiving, via one of one or more computing devices, a query comprising a set of query text;

generating, via one of the one or more computing devices, a vector representation of the set of query text;

performing, via one of the one or more computing devices, a vector-based matching operation on the vector representation of the set of query text against a plurality of response entries;

determining, via one of the one or more computing devices, a particular response entry to use for the query based on the vector-based matching operation;

identifying, via one of the one or more computing devices, a plurality of codes in the particular response entry;

determining, via one of the one or more computing devices, a respective type of each of the plurality of codes;

determining, via one of the one or more computing devices, a respective value for each of the plurality of codes based on the respective type, wherein a particular code of the plurality of codes for a particular type is determined by querying a large language model based on the particular code; and generating, via one of the one or more computing devices, a response to the query based on the particular response entry by replacing each of the plurality of codes with the respective value.

6. The method of claim 5, further comprising:

processing, via one of the one or more computing devices, the set of query language via a natural language processing algorithm to identify at least one context corresponding to the query; and identifying, via one of the one or more computing devices, a particular channel for the query of a plurality of channels based on the at least one context, wherein the plurality of response entries are associated with the particular channel.

7. The method of claim 6, wherein the plurality of channels comprise at least one of: a mobile application channel, a website channel, or a text message channel.

8. The method of claim 5, further comprising processing, via one of the one or more computing devices, the set of query text via a natural language processing algorithm to determine whether an intent is associated with the query, wherein the vector representation of the set of query text is generated in response to the intent not being associated with the query.

9. The method of claim 5, further comprising applying, via one of the one or more computing devices, a filter to the query.

10. The method of claim 5, further comprising:

generating, via one of the one or more computing devices, at least one user interface comprising a plurality of text entry fields;

receiving, via one of the at least one user interface, at least one input query from a first one of the plurality of text entry fields;

generating, via one of the one or more computing devices, an input set based on the at least one input query; and performing, via one of the one or more computing devices, a vectorization process on the input set to generate the particular response entry.

11. The method of claim 10, wherein the input set comprises at least one generated input query generated using an artificial intelligence algorithm on the at least one input query.

12. The method of claim 10, further comprising receiving, via one of the at least one user interface, a prewritten response corresponding to the input set from a second one of the plurality of text entry fields, wherein the particular response entry comprises the prewritten response and the response to the query is further generated based on the prewritten response.

13. A non-transitory computer-readable medium embodying a program that, when executed by at least one computing device, causes the at least one computing device to:

receive a query comprising a set of query text;

generate a vector representation of the set of query text;

performing a vector-based matching operation on the vector representation of the set of query text against a plurality of response entries;

determine a particular response entry to use for the query based on the vector-based matching operation;

identify a plurality of codes in the particular response entry;

determine a respective type of each of the plurality of codes;

determine a respective value for each of the plurality of codes based on the respective type, wherein a particular code of the plurality of codes for a particular type is determined by querying a large language model based on the particular code; and generate a response to the query based on the particular response entry by replacing each of the plurality of codes with the respective value.

14. The non-transitory computer-readable medium of claim 13, wherein the program further causes the at least one computing device to:

receive a plurality of queries comprising the query; and apply a set of filters to the plurality of queries to filter out a subset of the plurality of queries.

15. The non-transitory computer-readable medium of claim 13, wherein the program further causes the at least one computing device to:

generate a snippet based on a code in the response to the query; and generate the response by embedding the snippet in the response at the code.

16. The non-transitory computer-readable medium of claim 13, wherein the program further causes the at least one computing device to generate the response by embedding a button in the response at a particular code based on meta data in the code.

17. The non-transitory computer-readable medium of claim 13, wherein the program further causes the at least one computing device to generate the response to the query by:

parsing a prewritten response of the particular response entry to determine a code in the prewritten response;

identifying a value of a property associated with the code; and generating the response by replacing the code with the value.

18. The non-transitory computer-readable medium of claim 17, wherein the program further causes the at least one computing device to identify the value of the property by querying an application programming interface (API) associated with a type of the code.

* * * * *